United States Patent
Matsuo et al.

(10) Patent No.: US 7,931,872 B2
(45) Date of Patent: Apr. 26, 2011

(54) POLYMERIZATION PROCESSOR

(75) Inventors: Toshiaki Matsuo, Hitachi (JP);
Takayuki Matsumoto, Hitachi (JP);
Naruyasu Okamoto, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 1203 days.

(21) Appl. No.: 10/921,331

(22) Filed: Aug. 19, 2004

(65) Prior Publication Data

US 2005/0169817 A1    Aug. 4, 2005

(30) Foreign Application Priority Data

Feb. 4, 2004   (JP) .................................. 2004-028517

(51) Int. Cl.
*B01J 19/18*    (2006.01)
(52) U.S. Cl. ......... 422/134; 422/135; 422/138; 422/106
(58) Field of Classification Search .................. 422/134, 422/106, 131, 135, 138; 526/65; 525/53
See application file for complete search history.

(56) References Cited

U.S. PATENT DOCUMENTS

| | | | | |
|---|---|---|---|---|
| 3,243,481 A | * | 3/1966 | Ruffing et al. | 525/53 |
| 3,440,019 A | * | 4/1969 | Albrecht et al. | 422/134 |
| 3,499,873 A | * | 3/1970 | Kuehne et al. | 528/308.3 |
| 3,513,145 A | * | 5/1970 | Crawford | 526/65 |
| 3,639,652 A | * | 2/1972 | Mommaerts et al. | 523/343 |
| 3,709,664 A | * | 1/1973 | Krekeler et al. | 422/225 |
| 3,859,268 A | * | 1/1975 | Novack et al. | 526/65 |

FOREIGN PATENT DOCUMENTS

| | | | | |
|---|---|---|---|---|
| JP | 51140983 A | * | 12/1976 | |
| JP | 53094394 A | * | 8/1978 | |
| JP | 57-087032 | | 5/1982 | |
| JP | 60106831 A | * | 6/1985 | |
| JP | 60108420 A | * | 6/1985 | |
| JP | 04-064538 | | 6/1992 | |
| JP | 06-234845 | | 8/1994 | |
| JP | 08-259676 | | 10/1996 | |
| JP | 2000-198839 | | 7/2000 | |

* cited by examiner

*Primary Examiner* — Jennifer A Leung
(74) *Attorney, Agent, or Firm* — Antonelli, Terry, Stout & Kraus, LLP.

(57) ABSTRACT

A polymerization processor synthesizes a high quality polymer from a raw material in a molten state. Lactide sent from an apparatus for supplying lactide 1 is heated and molten in an apparatus for melting lactide 2, and a catalyst is added to the lactide in an apparatus for supplying a catalyst 3. The molten lactide is supplied through an apparatus for supplying lactide 4 to a horizontal reaction tank 5, and flows by a head difference with a polymerization reaction proceeding. A discharged reaction solution is supplied to the upper part of a vertical reaction tank 6, and flows through the vertical reaction tank 6 by gravity with the polymerization reaction proceeding. Thereafter, the reaction solution is transported to an apparatus for removing remaining lactide 7, where unreacted lactide is removed, and then the reaction solution is discharged.

35 Claims, 6 Drawing Sheets

POLYMERIZATION PROCESSOR

BACKGROUND OF THE INVENTION

1. Field of the Invention

The present invention relates to a polymerization processor for synthesizing a polymer from a polymer raw material in a molten state.

2. Description of the Related Art

Synthesis of a polymer by a ring-opening polymerization reaction may have a problem of degradation in quality such that the polymer is in part thermally degraded and colored due to prolonged temperature history and accumulation of heat of reaction associated with polymerization.

Polylactic acid, which is one of polymers synthesized by the ring-opening polymerization reaction, is a colorless and transparent polyester prepared using lactic acid being a biomass as a raw material. Methods for synthesizing polylactic acid from lactic acid includes a method in which lactic acid is condensed to produce an oligomer, a catalyst such as antimony oxide is added to the oligomer to carry out depolymerization to produce lactide, and a catalyst such as tin octylate is added to the lactide to carry out ring-opening polymerization. In this case, polylactic acid may be in part thermally degraded and colored due to a rise in temperature associated with heat of reaction during ring-opening polymerization. It is desired that the coloring is inhibited because it impairs colorlessness and transparency which is one of the characteristics of polylactic acid.

Thus, in the invention described in JP Patent Publication (Kokai) No. 8-259676A (1996), a continuous polymerization in which a plurality of reaction tanks for ring-opening polymerization of lactide are prepared, and the reaction tanks are connected in series to supply a raw material and discharge a polymerized product at the same time is employed, and operations are carried out with temperature, the concentration of catalyst and retention time varied for each reaction tank to alleviate thermal degradation due to temperature history. In this system, however, factors contributing to coloring such as (1) prolonged temperature history resulting from variations in retention time due to mixture of a polymer having a low polymerization degree and viscosity and a polymer having a high polymerization degree and viscosity and (2) acceleration of thermal degradation associated with accumulation of heat of reaction associated with ring-opening polymerization reaction, are not eliminated yet.

SUMMARY OF THE INVENTION

The object of the present invention is to provide a polymerization processor from a raw material in a molten state, which can synthesize a polymer of high quality.

As a result of conducting vigorous studies for solving the above problem, the inventors found that mixture of polymers having different polymerization degrees and viscosities could be inhibited by carrying out a ring-opening polymerization reaction in a reaction tank having an agitator placed with its rotation axis substantially horizontal to the ground and at least one partition placed within the tank in the initial stage of the reaction, and that efficiency of removal of heat of reaction could be improved by carrying out the ring-opening polymerization reaction in a reaction tank having an agitator placed with its rotation axis substantially vertical to the ground in the final stage of the reaction. The inventors found that coloring associated with thermal degradation of the polymerized product could be inhibited by carrying out the ring-opening polymerization reaction in a reactor having connected in series a plurality of reaction tanks including at least one of the above reaction tanks in a specific arrangement, leading to completion of the present invention.

In one embodiment, the present invention relates to a polymerization processor comprising a reactor, wherein the reactor comprises 2 or more reaction tanks connected in series, and the first-stage reaction tank thereof has an agitator placed with its rotation axis substantially horizontal to the ground and at least one partition placed within the tank.

In another embodiment, the present invention relates to a polymerization processor comprising a reactor, wherein the reactor comprises 2 or more reaction tanks connected in series, the final-stage reaction tank thereof has an agitator placed with its rotation axis substantially vertical to the ground.

In another embodiment, the present invention relates to a polymerization processor comprising a reactor, wherein the reactor has (1) 2 or more reaction tanks connected in series, (2) at least one reaction tank existing in the fore stage has an agitator placed with its rotation axis substantially horizontal to the ground and at least one partition placed within the tank, and (3) at least one reaction tank existing in the rear stage has an agitator placed with its rotation axis substantially vertical to the ground.

In another embodiment, the present invention relates to the polymerization processor described above, wherein the partition has a through-hole.

In another embodiment, the present invention relates to any of the processors described above, wherein the temperature within the reaction tank included in the reactor is higher in the rear stage, and the retention time is shorter in the rear stage.

According to the present invention, a polymer of high quality can be synthesized.

DETAILED DESCRIPTION OF THE INVENTION

Figure 1:
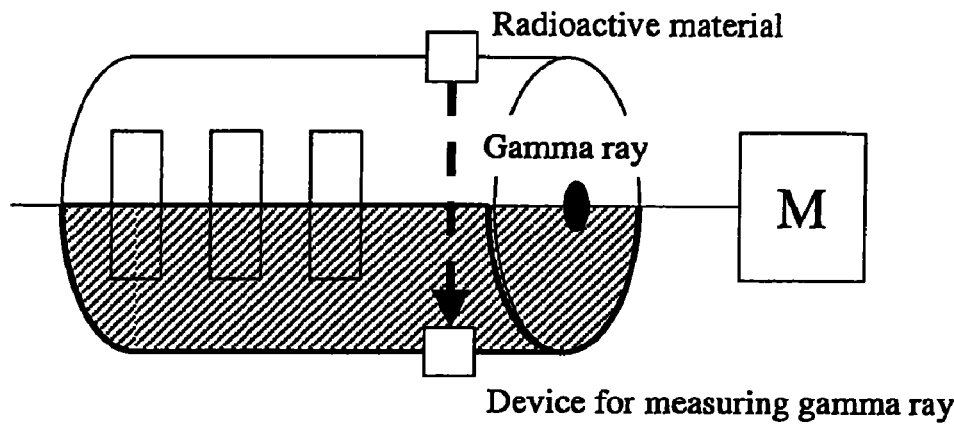
FIG. 1 shows a method of measuring a liquid level of a reaction solution in a reaction tank according to the present invention.
Figure 1:
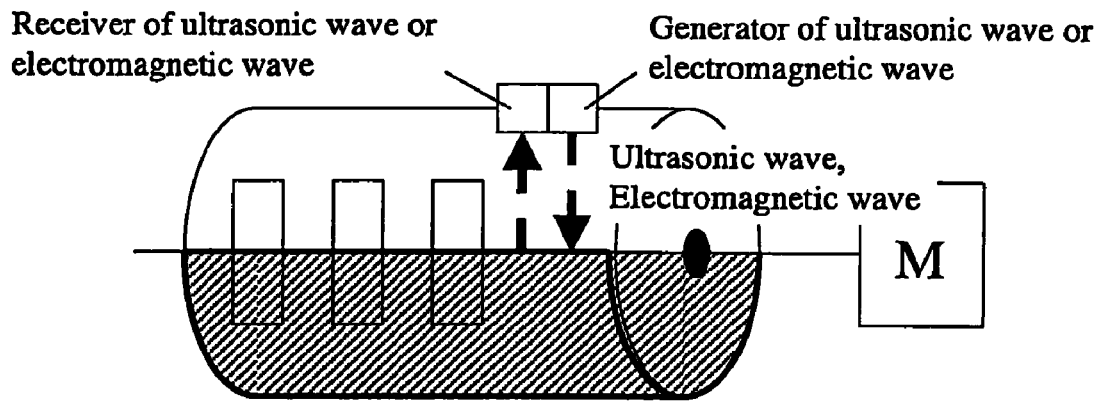
Figure 1:
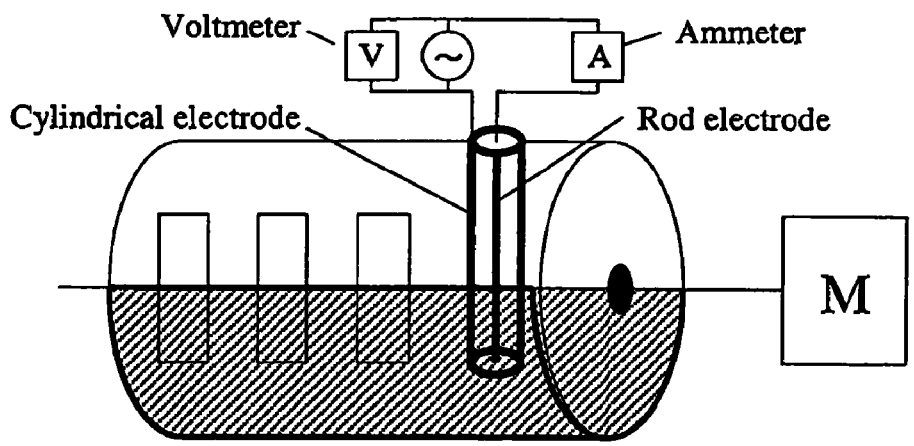

A polymerization processor of the present invention is suitably used for polymerization reactions of polymers generating heat of reaction during the polymerization reaction. Such polymers include polymers produced by ring-opening polymerization reactions or addition polymerization reactions. With regard to he polymer produced by the ring-opening polymerization reaction, the present invention is suitably used for the polymerization reaction of polymers, synthesized by the ring-opening polymerization reaction of cyclic polymer raw materials, especially cyclic dimers, in particular, it is suitably used for the polymerization reaction of polyesters. Examples of the polymer include polylactic acid, copolymers having lactic acid as a main constituent, polyglycolic acid and copolymers having polyglycolic acid as a main constituent. Examples of the polymer produced by the addition polymerization reaction, for which the processor of the present invention is suitably used, include polystyrene, polyvinylene carbonate, polyacrylonitrile, polymethyl methacrylate, polymethyl ethacrylate, polycellulose acetate, polyvinyl acetate, and copolymers containing these polymers.

The processor of the present invention is suitably used especially for synthesis of polylactic acid by ring-opening polymerization of lactide. Here, the lactide for use as a raw material of polylactic acid refers to a cyclic ester produced by removal of two water molecules from two lactic acid molecules, and the polylactic acid refers to a polymer having lactic acid as a main constituent, and includes poly L-lactic acid homopolymers, poly D-lactic acid homopolymers, poly L/D-lactic acid copolymers, copolymerized polylactic acids obtained by copolymerization of these polylactic acids with other ester bond forming components, e.g. hydroxycarboxylic acids, lactones, dicarboxylic acids and diols and the like, and substances obtained by mixing these polymers with additives as sub-components. Examples of hydroxycarboxylic acids include glycolic acid, hydroxybutylcarboxylic acid and hydroxybenzoic acid, examples of lactones include butyrolactone and caprolactone, examples of dicarboxylic acids include $C_{4-20}$ aliphatic dicarboxylic acids, and aromatic dicarboxylic acids such as phthalic acid, isophthalic acid, terephthalic acid and naphthalene dicarboxylic acid, and examples of diols include $C_{2-20}$ aliphatic diols. Oligomers and polymers of polyalkylene ethers such as polyethylene glycol, polypropylene glycol and polybutylene ether are also used as copolymerization components. Similarly, oligomers and polymers of polyalkylene carbonate are used as copolymerization components. Examples of additives include antioxidants, stabilizers, ultraviolet absorbers, pigments, dyes, inorganic particles, various kinds of fillers, mold release agents, plasticizers and other similar agents. The content of the copolymerization components and additives is not limited but preferably, the main component is lactic acid or a substance derived from lactic acid, and the content of the copolymerization components and additives is up to 50% by weight, especially up to 30% by weight.

The polymerization processor of the present invention is a processor for polymerizing a polymer raw material in a molten state to synthesize a polymer continuously or intermittently, wherein a reaction solution containing the raw material in a molten state and a catalyst is heated in a reactor to carry out a polymerization reaction. The raw material refers to monomers, cyclic monomers, cyclic dimer of monomers, oligomers and the like, which are constituent components for synthesis of the polymer by a polymerization reaction. In synthesis of polylactic acid, lactide is used as a raw material, a reaction solution containing raw material lactide in a molten state and a catalyst is heated in the reactor to carry out a ring-opening polymerization reaction of lactide, whereby lactide is polymerized in a molten state to synthesize polylactic acid continuously and intermittently. In this specification, the reaction solution encompasses all of molten materials, products and the like flowing in a step of synthesizing a polymer, such as the molten polymer raw material, mixtures of the molten raw material and a catalyst, and mixtures of the molten raw material, a catalyst and various kinds of polymerized products of different polymerization degrees.

In the present invention, the continuous or intermittent polymerization has a meaning that is usually used in the art, and includes the case where the supply of the raw material at least partially coincides with the discharge of the polymer as a product, and the case where the raw material is supplied continuously or intermittently and the polymer is discharged continuously or intermittently.

If the raw material is in a molten state, the molten raw material may be supplied directly to the reactor with the catalyst added to the molten raw material for the polymerization reaction, but if the raw material is a solid material such as a powder, the raw material is molten in advance by heating the raw material using an apparatus for melting a raw material. The heating temperature in the apparatus for melting a raw material is not specifically limited as long as it equals a melting point or higher of the raw material. Thus, if the raw material is lactide, the temperature is not specifically limited as long as it is 95° C. or higher, but the temperature is usually 95 to 160° C., preferably 110 to 130° C. By setting the temperature to 160° C. or lower, degradation of lactide with heat can be prevented.

With regard to the catalyst for the polymerization reaction, those skilled in the art can appropriate select suitable one depending on a polymer to be synthesized. For example, as the catalyst that is used for ring-opening polymerization of lactide, a well known catalyst for polymerization of polylactic acid may be used. For example, a catalyst containing at least one type of metal selected from the group consisting of elements of IA, IVA, IVB and VA groups of the periodic table or metal compound thereof may be used.

Examples of those belonging to the IVA group include organic tin based catalysts (e.g. tin lactate, tin tartrate, tin dicaprylate, tin dilaurylate, tin dipalmitate, tin distearate, tin dioleate, tin α-naphthoate, tin β-naphthoate, tin octylate, etc.) and powder tin. Examples of those belonging to the IA group include hydroxides of alkali metals (e.g. sodium hydroxide, potassium hydroxide, lithium hydroxide, etc.), salts of alkali metals and weak acids (e.g. sodium lactate, sodium acetate, sodium carbonate, sodium octylate, sodium stearate, potassium lactate, potassium acetate, potassium carbonate, potassium octylate, etc.), and alkoxides of alkali metals (e.g. sodium methoxide, potassium methoxide, sodium ethoxide, potassium ethoxide, etc.). Examples of those belonging to the IVB group include titanium based compounds such as tetrapropyl titanate, and zirconium based compounds such as zirconium isopropoxide. Examples of those belonging to the VA group include antimony based compounds such as antimony trioxide. Among them, the organic tin based catalyst or tin compound is preferable in terms of activity.

The catalyst can be added to the molten raw material using an apparatus for adding catalyst that is usually used in the art. The catalyst may be added to the molten raw material before supplying the molten raw material to the reactor, or the catalyst may be added directly to the reactor.

In the present invention, the reactor for polymerizing the raw material comprises two or more reaction tanks connected in series, wherein the polymerization reaction is carried out by heating a reaction solution containing a molten raw material and a catalyst in the reaction tanks. The reactor should comprise two or more reaction tanks, and comprises normally two to four, preferably two or three, more preferably two reaction tanks.

The embodiment of the reactor for the polymerization reaction will be described below.

In one embodiment of the present invention, a reactor comprising two or more reaction tanks connected in series and comprising in at least the first stage thereof a reaction tank having an agitator placed with its rotation axis substantially horizontal to the ground and at least one partition placed within the tank is used as the reactor for carrying out the polymerization reaction.

Hereinafter, the above reaction tank having the agitator placed with its rotation axis substantially horizontal to the ground is referred to as a horizontal reaction tank. In this embodiment, the reactor has a horizontal reaction tank in at least the first stage, but may further have the horizontal reaction tank in the second and subsequent stages. The shape and the like of the reaction tank other than the reaction tank of the first stage are not specifically limited, and those that are usually used in the art may be used. The embodiment described above uses a reactor comprising the horizontal reaction tank in the first stage, but use of a reactor comprising in the preceding stage a tank in which substantially no polymerization reaction is carried out is also included in the scope of the present invention.

The term "substantially horizontal to the ground" does not mean that the rotation axis of the agitator is accurately horizontal to the ground, but means that the angle between the ground, i.e. horizontal line and the rotation axis is usually −5° to 5°, preferably −1° to 1°, more preferably 0°.

The shape of the horizontal reaction tank is not specifically limited, and may be a tank shape or barrel shape as long as it allows the agitator to be placed with its rotation axis substantially horizontal to the ground, but it is preferably a cylindrical shape having a center axis substantially horizontal to the ground. The horizontal reaction tank has, at one end in the direction of the rotation axis of the agitator, a supply port for supplying a reaction solution containing a molten raw material and has, at the other end, a discharge port for taking out the reaction solution. Thus, the supplied reaction solution moves substantially in the horizontal direction from the supply port to the discharge port. The supply port is preferably located above the axis of the agitator, and the discharge port is preferably located below the rotation axis of the agitator.

The agitator placed in the horizontal reaction tank is not specifically limited as long as it carries out agitation by rotation around the rotation axis situated substantially horizontally to the ground. Examples of the agitator include single, double or more-shaft mixers in which two or more agitating blades having circular, oblong, triangular, quadrangular and multilobar shapes and other shapes are placed with spaces on the rotation shaft. And in double or more-shaft mixers having two or more shafts, agitating blades of each shaft mutually engage. The double or more-shaft agitator in which the agitating blades mutually engage is preferable in terms of the self-cleaning action because the reaction solution can be prevented from being deposited on the rotation shaft of the agitator and the reaction tank. If a double-shaft mixer having a plurality of agitating blades is used, agitating blades of each rotation shaft are preferably placed in a staggered form, and the rotation shafts are preferably rotated in opposite directions.

The rotation axis does not necessarily mean just an actual rotation shaft member, but also includes a rotation axis line as merely a rotation center. Thus, if the rotation center of rotational motion of the agitator is substantially horizontal to the ground, an actual rotation shaft member does not necessarily exist.

For the heating method in the horizontal reaction tank, a method that is usually used in the art may be used, and examples of the method include various methods such as a method in which a jacket of a heat medium is placed around the outer periphery of the reaction tank, and the reaction solution is heated by heat transfer through the wall surface of the reaction tank, and a method in which a heat medium is passed through the rotation shaft of the agitator, and the reaction solution is heated by heat transfer. These methods may be used alone or in combination. The reaction tank is preferably heated at substantially constant temperature.

The molten raw material supplied into the horizontal reaction tank is initially heated by the above heating method and polymerized, but heat is transferred from the reaction solution to the heat medium when the temperature of the reaction solution becomes higher than that of the heat medium due to a rise in temperature associated with reaction heat. That is, the above heating method can act as a cooling method as well. Thus, in the case of a polymer generating reaction heat with the polymerization reaction, heat can be advantageously dissipated effectively.

Figure 3:
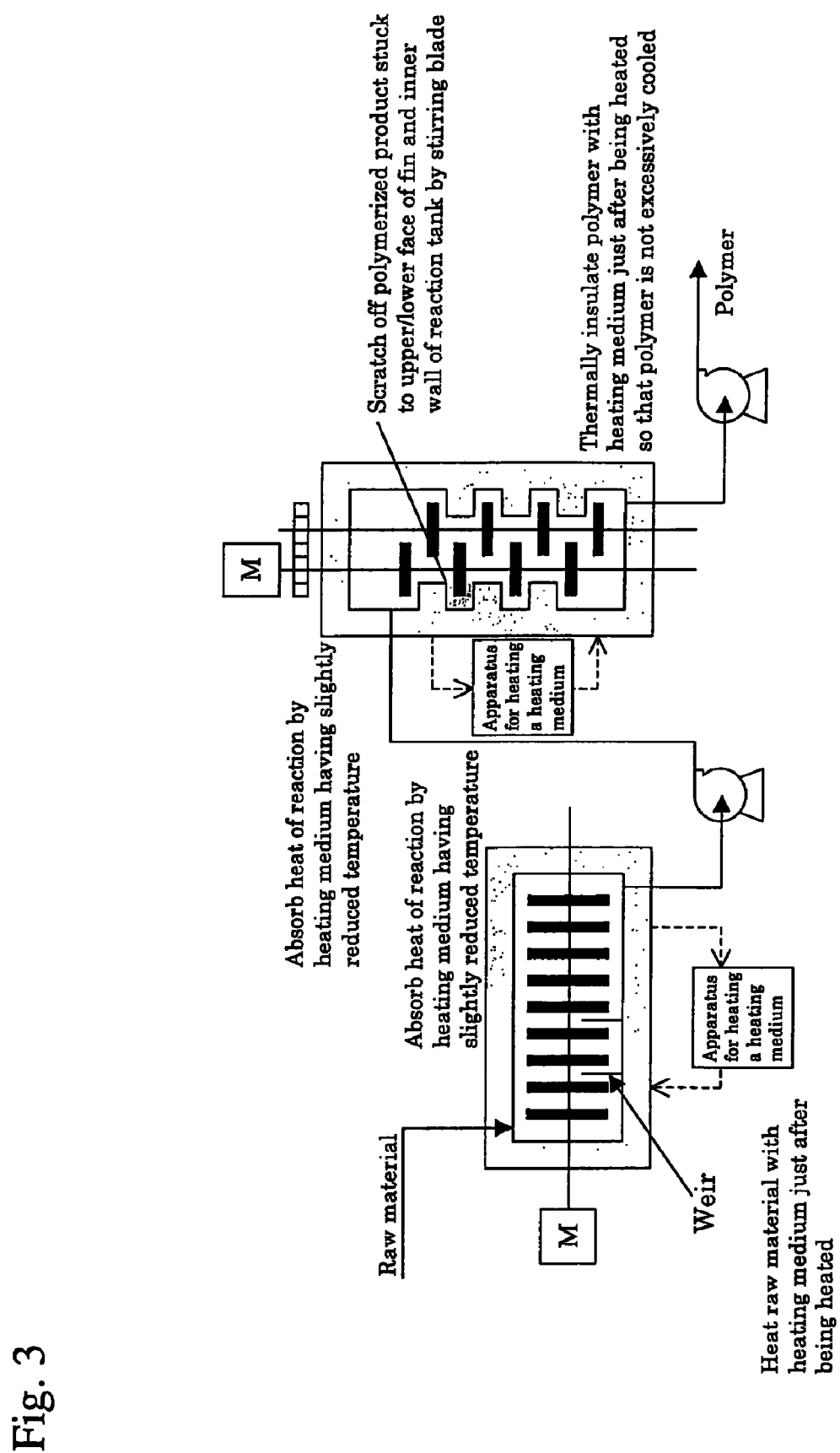
FIG. 3 shows one embodiment of a two-stage reactor comprising the horizontal reaction tank having partitions and the vertical reaction tank having irregularities on the side face.

A heating method in which the interior of the reaction tank is segmented into a plurality of areas and the temperature of the heat medium can be varied for each segmented area may be used as required. It can be considered that a plurality of heat medium jackets are used for this purpose. For example, the interior of the reaction tank can be segmented into areas between partitions. This makes it possible to set the temperature of the heat medium at a high level in an area where the reaction solution in low temperature is heated, and conversely set the temperature of the heat medium at a low level in an area where the temperature of the reaction solution is increased due to heat of reaction and thus removal of heat is required, for example. By supplying near the supply port the heat medium heated by an apparatus for heating a heat medium, a temperature gradient can be set in the reaction tank (e.g. see reaction tanks on the left side of FIG. 3). When the temperature of the heat medium decreases, part of the molten material may be solidified and deposited on the inner surface of the reaction tank, but in such a case, the deposited material can be stripped away by the agitator placed in the reaction tank.

The horizontal reaction tank has at least one partition placed in the tank. This partition is placed to inhibit a rapid flow of the reaction solution from the supply port to the discharge port of the reaction tank. The shape of the partition should allow the flow of the reaction solution to be inhibited, may be determined based on the shape of the reaction tank, and is preferably laminar. The way of placement of the partition is not specifically limited but for example, if the partition is laminar, it is placed at an angle approximately right to the ground. Furthermore, it is placed on the inner wall on the bottom of the reaction tank so that the lower part, for example the lower half or one-third in the cross section of the reaction tank vertical to the rotation axis of the agitator. Here, the angle approximately right to the ground means that the angle between the ground and the laminar partition is 85 to 95° C., preferably 89 to 91° C., more preferably 90° C.

For the material of the partition, a thermally insulating material is preferably used.

In terms of improving fluidity of the polymer, at least one through-holes may be provided in the partition, and the through-holes exist near the bottom of the reaction tank, preferably at the border with the inner wall of the bottom of the reaction tank. The number of through-holes is usually 1 to 10, preferably 1 to 5. By providing the through holes, the reaction solution can be made to flow at an appropriate speed.

Those skilled in the art can appropriately determine the placement position and spacing between the partitions based on reaction conditions and the like. For example, the placement position can be determined so that viscosity distribution of the polymer is uniform in each area. Furthermore, after the placement position of the partition in the reaction tank is determined, the diameter of the through-hole can be determined so that the resistance with which the reaction solution at a given flow rate passes through the through-hole is smaller than a driving force due to a head difference of the reaction solution between before and after the partition.

The area between two partitions acts like a single mixing cell, and the reaction solution is homogenized by being agitated by the agitator. Consequently, the molten low-viscosity raw material and a low-viscosity polymerized product having a low polymerization degree flow at a higher speed than a high-viscosity polymerized product having a high polymerization degree, thus making it possible to inhibit mixture of the former and the latter. If the horizontal reaction tank is provided in the second and subsequent stages, an increase in viscosity of the polymerized product can be expected to some degree, and therefore the partition may be omitted.

By providing a head difference between the supply port and the discharge port in the horizontal reaction tank, a driving force for the reaction solution to move from the supply port to the discharge port can be given. The reaction solution flows through the through-hole, or the reaction solution situated at a position higher than the partition flows to a subsequent area by the head difference, whereby the reaction solution can flow through the horizontal reaction tank toward the discharge port.

In the horizontal reaction tank, the amount of reaction solution supplied is not specifically limited, but the reaction solution is supplied in an amount such that the solution is filled up to usually 10 to 70%, preferably 40 to 50% based on the volume of the horizontal reaction tank. Furthermore, it is preferably supplied in an amount such that the height of the partitions is not exceeded. This is because rapid flow of unreacted lactide can be effectively inhibited.

By installing an apparatus for measuring the liquid level of the reaction solution in the horizontal reaction tank as required, and feeding back measurement signals to liquid feeding pump at the supply port of the reaction tank or a liquid feeding pump at the discharge port of the reaction tank, the amount of reaction solution fed can be adjusted so that the height of the liquid level equals to a predetermined value. Examples of the method for measuring the liquid level include a method in which a radioactive material is placed in the upper part of the horizontal reaction tank, and the liquid level is measured based on the amount of a gamma ray which is generated from the material and transmits through the reaction solution, a method in which an ultrasonic wave or electromagnetic wave is emitted from the upper part of the horizontal reaction tank to measure a reflection wave thereof, whereby the liquid level is measured, and a method in which a barrel condenser is placed in the upper part of the horizontal reaction tank, and put into the reaction solution, and a change in dielectric constant associated with the level of the reaction solution in the barrel is measured, whereby the liquid level is measured (FIG. 1).

Those skilled in the art can appropriately determine reaction conditions in the horizontal reaction tank in the first stage, but the average reaction temperature in the reaction tank is usually 140 to 180° C., preferably 160 to 170° C., and the retention time is usually 5 to 15 hours, preferably 7 to 10 hours. The reaction conditions are preferably set so that a polymerized product having a weight average molecular weight of normally 50 to 200 thousands, preferably 150 to 200 thousands can be obtained from the discharge port of the horizontal reaction tank of the first stage.

By using the horizontal reaction tank as the fist stage reaction tank, and providing the above partition within the reaction tank of the first stage, the molten raw material having a low viscosity and a polymerized product having a low polymerization degree and a low viscosity can be inhibited from being mixed with a polymerized product undergoing a polymerization reaction to some extent, whereby piston flowability in the reaction tank is ensured. The reaction solution in an unreacted state can be prevented from proceeding to a next step, and can sufficiently be reacted in the reaction tank of the first stage. Thus, prolonged temperature history resulting from variations in retention time is prevented, and therefore degradation of the polymerized product due to thermal degradation is inhibited, thus making it possible to obtain a polymer of high quality.

In another embodiment of the present invention, a reactor comprising two or more reaction tanks connected in series and comprising in at least the final stage a reaction tank having an agitator placed with its rotation axis substantially vertical to the ground is used as a reactor for carrying out a polymerization reaction.

Hereinafter, the above reaction tank having an agitator placed with its rotation axis substantially vertical to the ground is referred to as a vertical reaction tank. In this embodiment, the reactor has a vertical reaction tank in at least the final stage, but may further have the vertical reaction tank in stages other than the final stage. The shape and the like of the reaction tank other than the reaction tank of the final stage are not specifically limited, and those that are usually used in the art may be used. The embodiment described above uses a reactor comprising the vertical reaction tank in the final stage, but use of a reactor comprising in the subsequent stage a tank in which substantially no polymerization reaction is carried out is also included in the scope of the present invention.

The term "substantially vertical to the ground" does not mean that the rotation axis of the agitator is accurately vertical to the ground, but means that the angle between the ground, i.e. horizontal line and the rotation axis is usually 85° to 95°, preferably 89° to 91°, more preferably 90°.

Like the horizontal reaction tank, the above rotation axis does not necessarily mean just an actual rotation shaft member, but also includes a rotation axis line as merely a rotation center. Thus, if the rotation center of rotational motion of the agitator is substantially vertical to the ground, an actual rotation shaft member does not necessarily exist.

The shape of the vertical reaction tank is not specifically limited, and may be a tank shape or barrel shape as long as it allows the agitator to be placed with its rotation axis substantially vertical to the ground, but it is preferably a cylindrical shape having a center axis substantially in parallel to the rotation axis of the agitator. The vertical reaction tank has, at one end in the direction of the rotation axis of the agitator, a supply port for supplying the reaction solution from the reaction tank in the preceding stage and has, at the other end, a discharge port for taking out the reaction solution. Thus, the supplied reaction solution moves substantially vertically from the supply port to the discharge port. It is preferable that the supply port exists in the upper part of the reaction tank, and the discharge port exists in the lower part of the reaction tank. The specific gravity of the polymerized product increases with progression of the polymerization reaction and therefore by providing the supply port in the upper part, a polymerized product having a low polymerization degree can be inhibited from being mixed with a polymerized product having a high polymerization degree.

The agitator placed in the vertical reaction tank is not specifically limited as long as it carries out agitation by rotation around the rotation axis situated substantially vertically to the ground. Examples of the agitator include single, double or more-shaft mixers in which two or more agitating blades having circular, oblong, triangular, quadrangular and multilobar shapes and other shapes are placed with spaces on the rotation shaft. And in double or more-shaft mixers having two or more shafts, those agitating blades of each shaft mutually engage. Preferable is a double-shaft mixer having a plurality of agitating blades in which agitating blades of each rotation shaft are placed in a staggered form. Furthermore, in this case, each rotation shaft is preferably rotated in opposite directions. The double or more-shaft agitator can prevent deposition of the polymerized product and the like on the rotation shaft of the agitator and the reaction tank. In terms of the self-cleaning action, it is especially advantageously used in the reaction tank of the rear stage in which the polymerization reaction proceeds and the viscosity of the polymerized product increases.

As in the case of the horizontal reaction tank, a method that is usually used in the art may be used as the heating method in the vertical reaction tank. Examples of the heating method include various methods such as a method in which a jacket of a heat medium is placed around the outer periphery of the reaction tank, and the reaction solution is heated by heat transfer through the wall surface of the reaction tank, and a method in which a heat medium is passed through the rotation shaft of the agitator, and the reaction solution is heated by heat transfer. These methods may be used alone or in combination.

The molten raw material supplied into the vertical reaction tank is initially heated by the above heating method and its polymerization reaction thus proceeds, but when the temperature of the reaction solution becomes higher than that of a heat medium due to a rise in temperature associated with heat of reaction, heat is conversely transferred from the reaction solution to the heat medium. Thus, as in the case of the horizontal reaction tank, a heating method in which the interior of the reaction tank is segmented into a plurality of areas and the temperature of the heat medium can be varied for each segmented area may be used as required. In this way, it is possible to set the temperature of the heat medium to a high level in an area where the reaction solution of low temperature is heated, and conversely set the temperature of the heat medium to a low level in an area where the temperature of the reaction solution is increased due to heat of reaction and thus removal of heat is required, for example. If further removal of heat is required, efficient of removal of heat can be further improved by, for example, providing a fin (irregularities on the side face of the reaction tank) in the vertical reaction tank. Furthermore, an aspect can be considered in which a heat medium heated by an apparatus for heating a heat medium is supplied near the discharge port, whereby the polymer is thermally insulated to prevent the polymer from being excessively cooled (e.g. see reaction tank on the right side of FIG. 3).

In the rear stage of the polymerization reaction, the reaction is carried out preferably at a high temperature, and therefore there arises a problem of degradation of the polymerized product associated with a rise in temperature, but by using the vertical reaction tank in the final stage, the rise in temperature can be inhibited, and degradation and coloring of the polymerized product can be alleviated.

Figure 2:
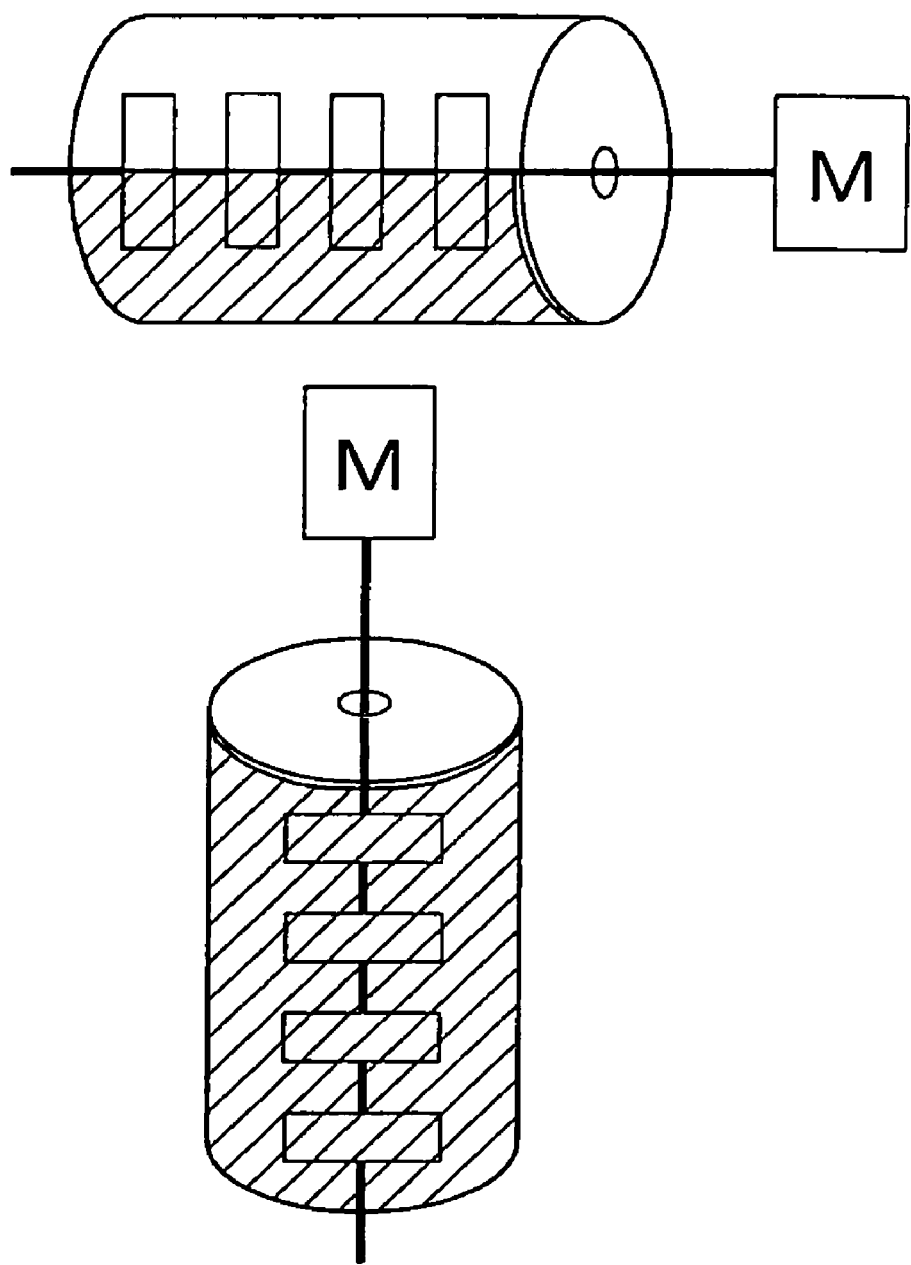
FIG. 2 shows a concept of an area of the reaction solution contacting the inner wall of the reaction tank in a horizontal reaction tank and a vertical reaction tank used in the present invention.

In the vertical reaction tank, the amount of reaction solution supplied is not specifically limited, but the reaction solution is supplied in an amount such that the solution is filled up to usually 20 to 100%, preferably 60 to 100% based on the volume of the vertical reaction tank. Thus, compared with the conventional horizontal reaction tank in which the reaction solution is introduced usually in an amount as small as the half volume of the reaction tank, the area of the reaction solution contacting the inner wall of the reaction tank is large, thus making it possible to increase the area of heat-transfer surface (FIG. 2). By removing heat of reaction associated with polymerization of the raw material using heat transfer, a rise in temperature of the reaction solution can be reduced and in the rear stage of the polymerization reaction, degradation of the produced polymerized product associated with thermal degradation can be effectively inhibited, and coloring can be prevented. Particularly, in ring-opening polymerization of lactide, coloring of polylactic acid can be effectively prevented. Furthermore, by making the vertical reaction tank to have irregularities on the side face, the area of heat-transfer surface can be further increased, and heat removal efficiency can be improved. In the above aspect in which irregularities are provided on the side face, a high-viscosity polymerized product stuck on the inner wall of the reaction tank can be scratched off by placing agitating blades such that they engage with recessed portions of the reaction tank (e.g. see reaction tank on the right side of FIG. 3).

In the vertical reaction tank, like the horizontal reaction tank, by installing an apparatus for measuring the liquid level of the reaction solution as required, and feeding back measurement signals to liquid feeding pump at the supply port of the reaction tank or a liquid feeding pump at the discharge port of the reaction tank, the amount of reaction solution fed can be adjusted so that the height of the liquid level equals a predetermined value. Examples of the method for measurement of the liquid level include a method in which a radioactive material is placed in the upper part of the vertical reaction tank, and the liquid level is measured based on the amount of a gamma ray which is generated from the material and transmits through the reaction solution, a method in which an ultrasonic wave or electromagnetic wave is emitted from the upper part of the vertical reaction tank to measure a reflection wave thereof, whereby the liquid level is measured, and a method in which a barrel condenser is placed in the upper part of the vertical reaction tank, and put into the reaction solution, and a change in dielectric constant associated with the level of the reaction solution in the barrel is measured to measure the liquid level (FIG. 1).

Those skilled in the art can appropriately determine reaction conditions in the vertical reaction tank in the final stage, but the average reaction temperature in the reaction tank is usually 180 to 220° C., preferably 190 to 210° C., and the retention time is usually 1 to 7 hours, preferably 3 to 5 hours. The reaction conditions are preferably set so that a polymerized product having a weight average molecular weight of normally 100 to 500 thousands, preferably 200 to 300 thousands can be obtained from the discharge port of the vertical reaction tank of the final stage.

In still another embodiment of the present invention, a reactor comprising two or more reaction tanks connected in series, comprising in the fore stage at least one reaction tank having an agitator placed with its rotation axis substantially horizontal to the ground and at least one partition placed within the tank, and comprising in the rear stage at least one reaction tank having an agitator placed with its rotation axis substantially vertical to the ground is used as a reactor for carrying out a polymerization reaction, especially a ring-opening polymerization reaction. That is, the reactor comprising two or more reaction tanks connected in series comprises in the fore stage at least one horizontal reaction tank having at least one partition, and further comprises in the rear stage at least one vertical reaction tank. The horizontal reaction tank in the fore stage having at least one partition and the vertical reaction tank in the rear stage are same as those described above. Furthermore, the shape and the like of the reaction tanks other than the above two reaction tanks are not specifically limited, and those that are usually used in the art may be used.

Here, the term "comprising in the fore stage at least one horizontal reaction tank having at least one partition" means that at least one horizontal reaction tank having at least one partition exists antecedent to the middle stage, of the reaction tanks included in the reactor, preferably in first to third stages, more preferably in the first stage. Similarly, the term "comprising in the rear stage at least one vertical reaction tank" means that at least one vertical reaction tank exists at the rear of the middle stage, preferably in first to third stages from the last, more preferably in the final stage. However, at least one vertical reaction tank exists at the rear of the horizontal reaction tank having at least one partition. Most preferable is a reactor comprising two reaction tanks, wherein the horizontal reaction tank having at least one partition is in the fore stage, and the vertical reaction tank is in the rear stage. This is because such a reactor is operated at a low cost, and allows total reaction time to be reduced, whereby degradation of the polymerized product can be inhibited.

In this embodiment, in the initial stage of the polymerization reaction, by combining the horizontal reaction tank having at least one partition with the vertical reaction tank, mixture of polymerized products of different polymerization degrees and viscosities can be inhibited to prevent prolonged temperature history in the horizontal reaction tank of the fore stage, and in the final stage of the polymerization reaction, efficiency of removal of heat of reaction in a highly polymerized product with high viscosity can be improved in the vertical reaction tank of the rear stage. In the initial stage of the reaction, a problem of coloring due to thermal degradation of the polymerized product is not significant, and therefore there arises no problem even if the horizontal reaction tank is used. While in the final stage of the reaction, there is no possibility that a polymerized product having a low viscosity and a low polymerization degree rapidly flows because the reactant has a high polymerization degree and a high viscosity, and therefore there arises no problem even if the vertical reaction tank is used. By using a reactor having suitably combined the horizontal reaction tank and vertical reaction tank having different features and effects, degradation associated with thermal degradation can be inhibited, and coloring can be prevented very effectively.

For reaction conditions in the horizontal reaction tank of the fore stage and the vertical reaction tank of the rear stage, the reaction may be carried out under conditions same as those described above.

Further, in any of the embodiments described above, it is preferable that the temperature in the reaction tanks included in the reactor is higher in the rear stage, and the retention time in the reaction tanks is shorter in the rear stage. In the initial stage of the reaction, the polymerization reactions is made to proceed as further as possible by carrying out the polymerization reaction at a low temperature in which influences of thermal degradation are relatively small, and in the rear stage where the polymerization reaction becomes slower, the polymerization reaction is made to proceed under higher temperature conditions to shorten reaction time under high temperature conditions to inhibit degradation of the polymerized product, whereby a less colored high-quality polymer can be obtained. In this aspect, for example, the temperature in the reaction tank of the first stage is 140 to 180° C., preferably 160 to 170° C., the temperature in the reaction tank of the final stage is 180 to 220° C., preferably 190 to 210° C., and the temperature is set so that the temperature increases step by step from the first stage to the final stage.

In the polymerization processor of the present invention, an apparatus for removing remaining raw material can be installed in the subsequent stage to the reactor for polymerization to remove an unreacted raw material from the reaction solution discharged from the reactor. In the apparatus for removing remaining raw material, a vacuum environment is created while a molten state is maintained, whereby the unreacted raw material, e.g. lactide is removed.

Further, the polymerized product obtained through the synthesis method of the present invention is usually subjected to pelletization processing or the like using water cooling and a chip cutter, but such processing may be omitted.

A nitrogen gas supplying pipe and discharging pipe for purging the interior with nitrogen gas is preferably provided in each of the apparatus for melting a raw material, the apparatus for supplying catalysts, the reactor comprising the horizontal reaction tank and/or the vertical reaction tank, the apparatus for removing remaining raw material and the like, which are used in the polymerization processor of the present invention. Essentially, the operation of the synthesis process is started preferably after all apparatuses in the process are purged with nitrogen. This allows the reaction solution to be prevented from being scorched due to existence of oxygen. Furthermore, preferably, the apparatus for melting a raw material, the apparatus for supplying catalysts, the apparatus for supplying a raw material, the horizontal reaction tank, the vertical reaction tank and the like are operated under approximately an atmospheric pressure. In this way, volatilization of the molten raw material can be alleviated.

This specification includes part or all of the contents as disclosed in the specification and/or drawings of Japanese Patent Application No. 2004-028517, which is a priority document of the present application.

Preferred Embodiment of the Invention

The present invention will be described more in detail below with Examples, but the scope of the present invention is not limited thereto.

EXAMPLE 1

Figure 4:
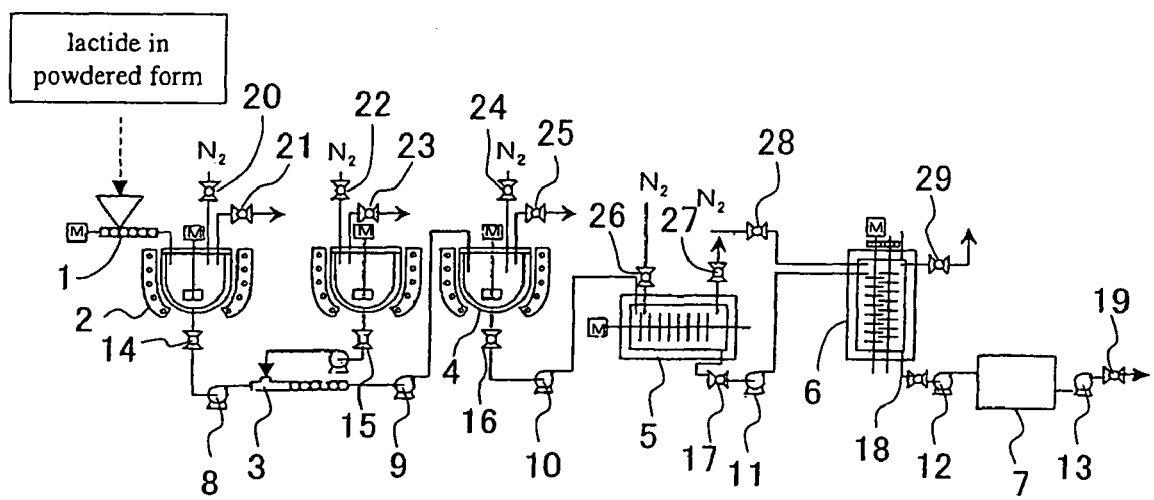
FIG. 4 shows one example of a method for polymerization of polylactic acid of the present invention.

As one example of a polymerization processor of the present invention, example of a processor for synthesizing polylactic acid is shown in FIG. 4. In this Example, polylactic acid is synthesized using a processor comprising an apparatus for supplying lactide 1, an apparatus for melting lactide 2, an apparatus for supplying a catalyst 3, an apparatus for supplying lactide 4, a horizontal reaction tank 5, a vertical reaction tank 6, an apparatus for removing remaining lactide 7, liquid feeding pumps 8 to 13 and valves 14 to 29. In this Example, a reactor having the horizontal reaction tank 5 and the vertical reaction tank 6 connected in series is used as a reactor. The liquid feeding pumps 8 to 13 may be in part omitted if the viscosity of a liquid to be transported is so low that the liquid can be fed using gravity or the like. Furthermore, the valves 14 to 25 may also be omitted.

The apparatus for supplying lactide 1 supplies powdered lactide to the apparatus for melting lactide 2. Examples of the transportation system of the apparatus for supplying lactide 1 include transportation by a screw feeder, transportation by ultrasonic vibrations, and transportation by a gas flow. In the apparatus for melting lactide 2, sent lactide is heated and molten. The temperature at this time is higher than a melting point of lactide, and desirably equal to or lower than 160° C. so that degradation by heat does not occur. Molten lactide produced in the apparatus for melting lactide 2 is transported to the apparatus for supplying catalyst 3 by the liquid feeding pump 8. In the apparatus for supplying catalyst 3, a catalyst is supplied to the molten lactide. The molten lactide having the catalyst added thereto is supplied to the apparatus for supplying lactide 4 by the liquid feeding pump 9. In the apparatus for supplying lactide 4, the molten lactide is kept at a temperature higher than the melting point of lactide and desirably equal to or lower than 160° C. The apparatus for supplying lactide 4 is essentially a buffer tank for the reaction tanks 5 and 6 in subsequent stages, and may be omitted if not required. The molten lactide in the apparatus for supplying lactide 4 is supplied to the horizontal reaction tank 5 by the liquid feeding pump 10. Furthermore, if the apparatus for supplying lactide 4 is also omitted, the liquid feeding pump 10 is omitted. Liquid feeding pipes before and after the liquid feeding pumps 8 to 10 are all kept at a temperature higher than the melting point of lactide and desirably equal to or lower than 160° C. by means of heating, thermal insulation and the like for avoiding solidification and choking of lactide due to a drop in temperature.

In the horizontal reaction tank 5, the molten lactide flows by a head difference between a supply port and a discharge port, and a polymerization reaction thus proceeds. In the horizontal reaction tank 5, a reaction solution is heated by a jacket of a heat medium around the outer periphery of the reaction tank.

Figure 5:
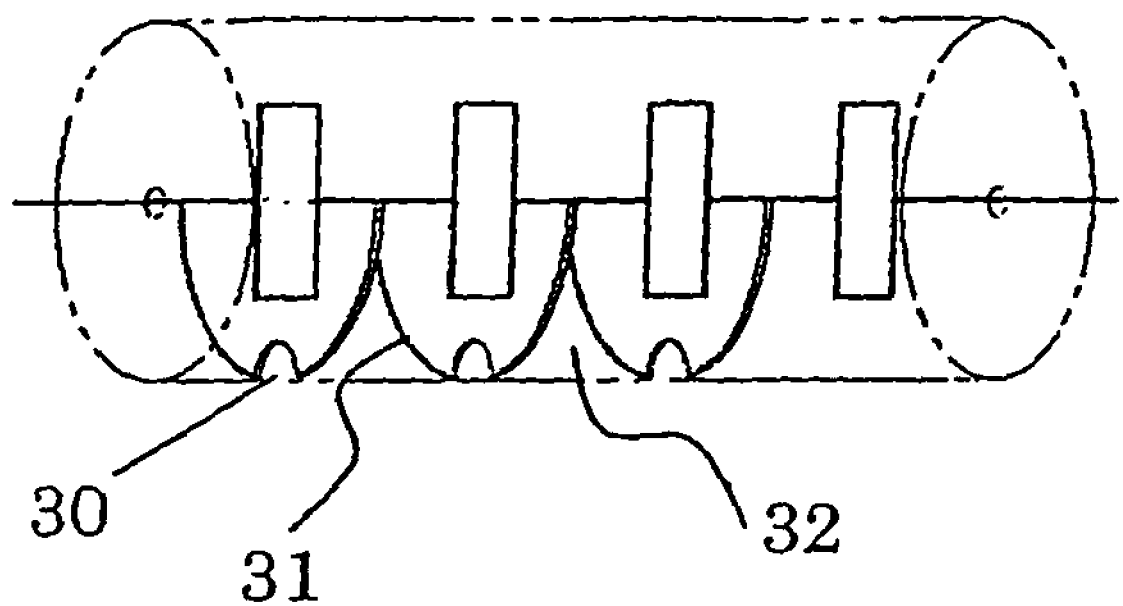
FIG. 5 is an enlarged view of the horizontal reaction tank 5 having partitions.

An enlarged view of the horizontal reaction tank 5 having partitions is shown in FIG. 5. A partition 31 having a through-hole 30 is placed in the horizontal reaction tank 5. In an inter-partition area 32, the reaction solution is homogenized by agitating (this area can be considered as a single mixing cell). Only the reaction solution located at a position higher than the partition can flow into the mixing cell in the subsequent stage by the head difference. The reaction solution in the horizontal reaction tank 5 is transported to the vertical reaction tank 6 by gravity and the liquid feeding pump 11. For the liquid feeding pump 11, a drawing screw, gear pump or the like can be selected depending on the viscosity of the reaction solution. Furthermore, if the reaction solution can be drawn from the horizontal reaction tank 5 by gravity, the liquid feeding pump 11 may be omitted. Transportation pipes before and after the liquid feeding pump 11 should be heated and thermally insulated for avoiding choking due to solidification of the reaction solution therein. The temperature thereof is desirably 200° C. or lower so that the reaction solution is not thermally degraded. In the horizontal reaction tank 5, an apparatus for measuring a liquid level of the reaction solution is installed as required, and measurement signals are fed back to the liquid feeding pump 10 or liquid feeding pump 11 to adjust the amount of reaction solution transported so that the height of the liquid level equals a predetermined value.

The reaction solution is transported to the supply port placed in the upper part of the vertical reaction tank 6, and flows toward the discharge port in the lower part of the vertical reaction tank 6 by gravity, and the polymerization reaction proceeds. In this way, a polymerized product having a low polymerization degree is prevented from being mixed with a polymerized product having a high polymerization degree. In the vertical reaction tank 6, the reaction solution is heated by the jacket of the heat medium around the outer periphery of the reaction tank.

Figure 6:
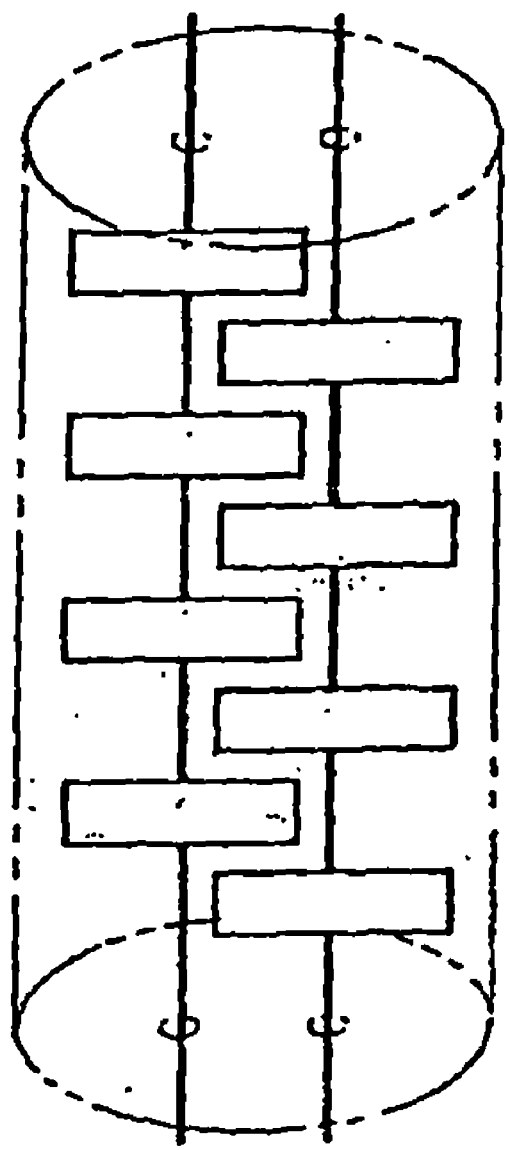
FIG. 6 is an enlarged view of the vertical reaction tank 6 having a double-shaft agitator.

In the vertical reaction tank 6, the area for heat-transfer can be increased compared to the horizontal reaction tank 5, and therefore efficiency of heating and removal of heat is high. Thus, by using the vertical reaction tank 6 in the final stage, degradation of the polymerized product due to a rise in temperature associated with heat of reaction can be alleviated. In the vertical reaction tank 6, an agitator having 2 rotation shafts provided with agitating blades (hereinafter referred to as double-shaft agitator), which is suitable for the agitating of a polymerized product having a high viscosity, is used. An enlarged view of the vertical reaction tank having a double-shaft agitator is shown in FIG. 6. The reaction solution in the vertical reaction tank 6 is transported to the apparatus for removing remaining lactide 7 by gravity and the liquid feeding pump 12. As the liquid feeding pump 12, a drawing screw, gear pump or the like can be selected depending on the viscosity of the reaction solution, as in the case of the liquid feeding pump 11. Transportation pipes before and after the liquid feeding pump 12 should be heated and thermally insulated for avoiding choking due to solidification of the reaction solution therein. The temperature thereof is desirably 200° C. or lower so that the polymerized product is not thermally degraded. In the vertical reaction tank 6, an apparatus measuring a liquid level of the reaction solution is installed as required, and measurement signals are fed back to the liquid feeding pump 11 or liquid feeding pump 12 to adjust the amount of reaction solution transported so that the height of the liquid level is adjusted to a predetermined value, as in the case of the horizontal reaction tank 5.

In the apparatus for removing remaining lactide 7, a vacuum environment is created while maintaining a molten state, and unreacted lactide is removed. The reaction solution after the processing is discharged by the liquid feeding pump 13. For the liquid feeding pump 13, a drawing screw, gear pump or the like can be selected depending on the viscosity of the reaction solution, as in the case of the liquid feeding pump 11. The discharged polymerized product is usually subjected to pelletization processing using water cooling and a chip cutter.

The apparatus for supplying lactide 1, the apparatus for melting lactide 2, the apparatus for supplying catalyst 3, the apparatus for supplying lactide 4, the horizontal reaction tank 5, the vertical reaction tank 6 and the apparatus for removing remaining lactide 7 are equipped with a pipe for supplying or discharging a nitrogen gas for purging the interior thereof with a nitrogen gas. This allows the reaction solution to be prevented from being scorched due to existence of oxygen. It is desirable that the operation of the process is essentially started after all apparatuses in the process should be purged with nitrogen. Furthermore, the apparatus for supplying lactide 1, the apparatus for melting lactide 2, the apparatus for supplying catalyst 3, the apparatus for supplying lactide 4, the horizontal reaction tank 5 and the vertical reaction tank 6 are operated under approximately an atmospheric pressure. This is intended for alleviation of volatilization of molten lactide.

EXAMPLE 2

Polylactic acid was synthesized by the processor shown in Example 1. The temperature of the apparatus for melting lactide 2 was set to 120° C., and molten lactide (molecular weight: 144) having a catalyst and a polymerization initiator dispersed therein was supplied to the horizontal reaction tank 5 at 120° C. In the horizontal reaction tank 5, the average temperature of the reaction solution was kept at 170° C. and the retention time thereof was kept at 10 hours. In the first half of the retention time, the reaction solution was heated by heat conduction from a jacket around the periphery of the reaction tank and in the second half, the temperature of the polymerized product itself increased due to heat of reaction associated with polymerization, but part of heat of reaction was removed via the inner wall of the reaction tank by heat conduction. Polylactic acid discharged from the horizontal reaction tank had a conversion ratio of 55% (calculated as conversion ratio=1—concentration of remaining lactide /concentration of initial lactide), a weight average molecular weight of 170 thousands and a viscosity of about 250Pa·s.

This polymerized product was then supplied to the vertical reaction tank 6. In the vertical reaction tank 6, the average temperature of the polymerized product was kept at 190° C.

and the retention time thereof was kept at 5 hours. During the retention time, the temperature of the polymerized product itself increased due to heat of reaction associated with polymerization, but part of heat of reaction was removed via the inner wall of the reaction tank by heat conduction. Furthermore, the heat rate per unit volume decreases as the polymerization reaction progresses, and therefore the temperature of the polymerized product itself increases as long as the heat rate exceeds the rate of removal of heat by heat conduction, but when the former falls below the latter, the temperature of the polymerized product itself decreases. Polylactic acid discharged from the vertical reaction tank 6 had a conversion ratio of 90%, a weight average molecular weight of 270 thousands, and a viscosity of about 2500 Pa·s.

The hue (yellow index) (b) of the obtained polylactic acid was measured with a colorimeter, and the result of b=4 was obtained. Accordingly, it became evident that according to the method of the present invention, less colored and high quality polylactic acid with b=4 or less could be obtained.

All publications (including patent applications) cited herein are incorporated herein by reference in their entirety.

What is claimed is:

1. A polymerization processor comprising:
    a reactor comprising two or more reaction tanks connected in series, the reaction tank in the final stage having an agitator placed with its rotation axis substantially vertical to the ground, the agitator comprising a double-shaft mixer having a plurality of agitation blades in which agitating blades of each rotation shaft are placed in staggered form, a supply port provided at an upper part of the reaction tank in the final stage, a discharge port provided in a lower part of the reaction tank in the final stage, and a heating jacket including a heat medium configured so that a temperature of the heat medium is at a high level in an area near the discharge port of the reaction tank in the final stage and the temperature of the heat medium is at a low level in an area near the supply port of the reaction tank in the final stage, wherein the reaction tank in the final stage is configured to control efficient removal of heat in selected areas by at least one of (a) being segmented into a plurality of areas so that the temperature of the heat medium can be at a high level in an area near the discharge port of the reaction tank in the final stage and at a low level in an area near the supply port of the reaction tank in the final stage and (b) provided with irregularities on its side face; and
    an apparatus, connected to the discharge port of the reaction tank in the final stage, for removing remaining raw material from reaction solution discharged from the reaction tank in the final stage.

2. The polymerization processor according to claim 1, wherein the reaction tank in the first stage has a supply port, a discharge port, an agitator placed with its rotation axis substantially horizontal to the ground and at least one partition placed within the tank, and a heating jacket including a heat medium, wherein an interior of the reaction tank in the first stage is segmented into a plurality of areas and configured such that a temperature of a heat medium is variable for each of the plurality of areas so that the temperature of the heat medium is at a high level in an area near the supply port of the reaction tank in the first stage and the temperature of the heat medium is at a low level in an area near the discharge port of the reaction tank in the first stage.

3. The polymerization processor according to claim 2, wherein the partition has at least one through-hole.

4. The polymerization processor according to claim 2, wherein the reactor is operable so that the temperature in the reaction tanks included in the reactor is higher in the final stage, and the retention time in the reaction tanks included in the reactor is shorter in the final stage.

5. The polymerization processor according to claim 1, wherein the reactor is operable so that the temperature in the reaction tanks included in the reactor is higher in the final stage, and the retention time in the reaction tanks included in the reactor is shorter in the final stage.

6. The polymerization processor according to claim 3, wherein the reactor is operable so that the temperature in the reaction tanks included in the reactor is higher in the final stage, and the retention time in the reaction tanks included in the reactor is shorter in the final stage.

7. The polymerization processor according to claim 1, further comprising an apparatus for heating the heat medium supplied near the discharge port of the final stage.

8. The polymerization processor according to claim 1, wherein the interior of the reaction tank in the final stage is segmented into a plurality of areas and the temperature of the heat medium is variable for each segmented area.

9. The polymerization processor according to claim 1, further comprising an apparatus for measuring the liquid level of the reaction solution installed in the reaction tank in the final stage, which feeds back measurement signals to a liquid feeding pump at the supply port or the discharge port of the reaction tank in the final stage.

10. The polymerization processor according to claim 2, further comprising an apparatus for heating the heating medium supplied to the area near the supply port of the reaction tank in the first stage.

11. The polymerization processor according to claim 1, wherein the reaction tank in the final stage is configured to control efficient removal of heat in selected areas by being segmented into a plurality of areas so that the temperature of the heat medium can be at a low level in an area where removal of heat is required.

12. The polymerization processor according to claim 11, wherein the reaction tank in the final stage is configured to control efficient removal of heat in selected areas by also being provided with irregularities on its side face.

13. A polymerization processor comprising a reactor, wherein the reactor has (1) two or more reaction tanks configured to be under approximately an atmosphere pressure connected in series, (2) at least one reaction tank existing in the fore stage has an agitator placed with its rotation axis substantially horizontal to the ground and at least one partition placed within the tank, and (3) at least one reaction tank existing in the rear stage has an agitator placed with its rotation axis substantially vertical to the ground, the agitator comprising a double-shaft mixer having a plurality of agitation blades, and has a jacket of a heat medium around an outer periphery of the reaction tank, wherein the reaction tank in the rear stage is configured to control efficient removal of heat in selected areas by at least one of (a) being segmented into a plurality of areas so that the temperature of the heat medium can be at a low level in an area where removal of heat is required and (b) provided with irregularities on its side face.

14. The polymerization processor according to claim 13, wherein the partition has at least one through-hole.

15. The polymerization processor according to claim 13, wherein the reactor is operable so that the temperature in the reaction tanks included in the reactor is higher in the rear stage, and the retention time in the reaction tanks included in the reactor is shorter in the rear stage.

16. The polymerization processor according to claim 13, wherein the agitating blades of each rotation shaft of the double-shaft mixer are placed in a staggered form.

17. The polymerization processor according to claim 13, further comprising an apparatus for measuring the liquid level of the reaction solution installed in the reaction tank in the rear stage and having an agitator placed with its rotation axis substantially vertical to the ground, which feeds back measurement signals to a liquid feeding pump at the supply port or the discharge port of the reaction tank in the rear stage.

18. The polymerization processor according to claim 13, wherein the reaction tank in the rear stage is configured to control efficient removal of heat in selected areas by being segmented into a plurality of areas so that the temperature of the heat medium can be at a low level in an area where removal of heat is required.

19. The polymerization processor according to claim 18, wherein the reaction tank in the rear stage is configured to control efficient removal of heat in selected areas by also being provided with irregularities on its side face.

20. The polymerization processor according to claim 13, wherein the reaction tank in the rear stage is configured to prevent mixing of the low polymerization degree product with the high polymerization degree product.

21. The polymerization processor according to claim 13, further comprising a source of polylactic acid.

22. The polymerization processor according to claim 13, wherein the reaction tank in the final stage is configured to prevent mixing of the low polymerization degree product with the high polymerization degree product.

23. The polymerization processor according to claim 13, further comprising a source of polylactic acid.

24. A polymerization processor for polymerization reactions of polymers generating heat of reaction during the polymerization reaction comprising:
a reactor comprising two or more reaction tanks connected in series, the reaction tank in the final stage having an agitator placed with its rotation axis substantially vertical to the ground, the agitator comprising a double-shaft mixer having a plurality of agitation blades in which agitating blades of each rotation shaft are placed in staggered form, a supply port provided at an upper part of the reaction tank in the final stage, a discharge port provided in a lower part of the reaction tank in the final stage, and a heating jacket including a heat medium configured so that a temperature of the heat medium is at a high level in an area near the discharge port of the reaction tank in the final stage and the temperature of the heat medium is at a low level in an area near the supply port of the reaction tank in the final stage, wherein the reaction tank in the final stage is configured to control efficient removal of heat in selected areas by at least one of (a) being segmented into a plurality of areas so that the temperature of the heat medium can be at a high level in an area near the discharge port of the reaction tank in the final stage and at a low level in an area near the supply port of the reaction tank in the final stage and (b) provided with irregularities on its side face; and
an apparatus, connected to the discharge port of the reaction tank in the final stage, for removing remaining raw material from reaction solution discharged from the reaction tank in the final stage.

25. The polymerization processor according to claim 24, wherein the processor is for ring-opening polymerization reactions.

26. The polymerization processor according to claim 24, wherein the reaction tank in the final stage is configured to control efficient removal of heat in selected areas by being segmented into a plurality of areas so that the temperature of the heat medium can be at a low level in an area where removal of heat is required.

27. The polymerization processor according to claim 26, wherein the reaction tank in the final stage is configured to control efficient removal of heat in selected areas by also being provided with irregularities on its side face.

28. The polymerization processor according to claim 24, wherein the reaction tank in the final stage is configured to prevent mixing of the low polymerization degree product with the high polymerization degree product.

29. The polymerization processor according to claim 24, further comprising a source of polylactic acid.

30. A polymerization processor for polymerization reactions of polymers generating heat of reaction during the polymerization reaction comprising a reactor, wherein the reactor has (1) two or more reaction tanks configured to be under approximately an atmosphere pressure connected in series, (2) at least one reaction tank existing in the fore stage has an agitator placed with its rotation axis substantially horizontal to the ground and at least one partition placed within the tank, and (3) at least one reaction tank existing in the rear stage has an agitator placed with its rotation axis substantially vertical to the ground, the agitator comprising a double-shaft mixer having a plurality of agitation blades, and has a jacket of a heat medium around an outer periphery of the reaction tank, wherein the reaction tank in the rear stage is configured to control efficient removal of heat in selected areas by at least one of (a) being segmented into a plurality of areas so that the temperature of the heat medium can be at a low level in an area where removal of heat is required and (b) provided with irregularities on its side face.

31. The polymerization processor according to claim 30, wherein the processor is for ring-opening polymerization reactions.

32. The polymerization processor according to claim 30, wherein the reaction tank in the rear stage is configured to control efficient removal of heat in selected areas by being segmented into a plurality of areas so that the temperature of the heat medium can be at a low level in an area where removal of heat is required.

33. The polymerization processor according to claim 32, wherein the reaction tank in the rear stage is configured to control efficient removal of heat in selected areas by also being provided with irregularities on its side face.

34. The polymerization processor according to claim 30, wherein the reaction tank in the rear stage is configured to prevent mixing of the low polymerization degree product with the high polymerization degree product.

35. The polymerization processor according to claim 30, further comprising a source of polylactic acid.

* * * * *